June 2, 1964  A. F. STANG  3,135,801

ISOMERIZATION OF ETHYL PENTABORANE (9)

Filed Feb. 4, 1959

1-ETHYLPENTABORANE (9)

2-ETHYLPENTABORANE (9)

Albert F. Stang  INVENTOR.

BY Donald L. Rose

United States Patent Office 3,135,801
Patented June 2, 1964

3,135,801
ISOMERIZATION OF ETHYL PENTABORANE(9)
Albert F. Stang, Mars, Pa., assignor to Callery Chemical Company, Pittsburgh, Pa., a corporation of Pennsylvania
Filed Feb. 4, 1959, Ser. No. 791,229
5 Claims. (Cl. 260—583)

This invention relates to the production of ethyl pentaborane(9) and more specifically to a method for the conversion of one isomer of ethyl pentaborane(9) into another desired isomer.

Ethylpentaborane(9) is the ethyl derivative of pentaborane(9), one of the most stable of the boron hydrides. It is useful as a fuel and particularly as a high-energy fuel in bi-propellant systems, such as turbojets, ramjets, and rockets, where it is combusted with conventional oxidizers such as air, liquid oxygen or peroxide to produce more thrust than is obtainable from other more conventional fuels. The presently preferred method for its preparation is the alkylation of pentaborane(9) with an ethyl halide in the presence of a catalyst such as aluminum chloride. This method is disclosed and claimed in the co-assigned application of Wunz and Stang, Ser. No. 756,048, filed August 14, 1958, now Patent No. 2,889,227, which was a continuation-in-part of Ser. No. 484,586, filed January 27, 1955, and now abandoned.

While the combustion characteristics and other chemical properties of ethylpentaborane(9) produced in accordance with the above and similar processes make it extremely valuable as a high energy fuel, certain other physical properties make it somewhat difficult to store and handle safely. For example, it is quite volatile and its spontaneous ignition temperature, i.e., the temperature at which it burns spontaneously in air, is lower than is desirable.

Figure 1:
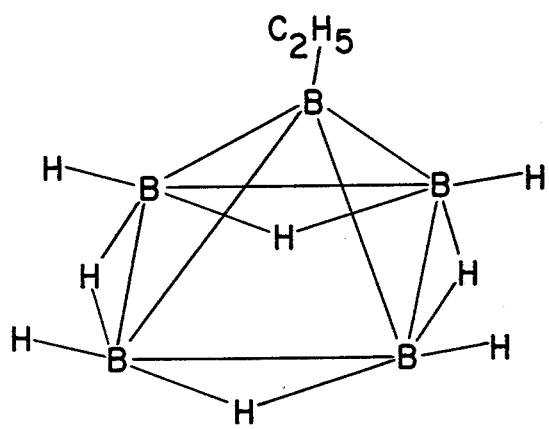
Figure 2:
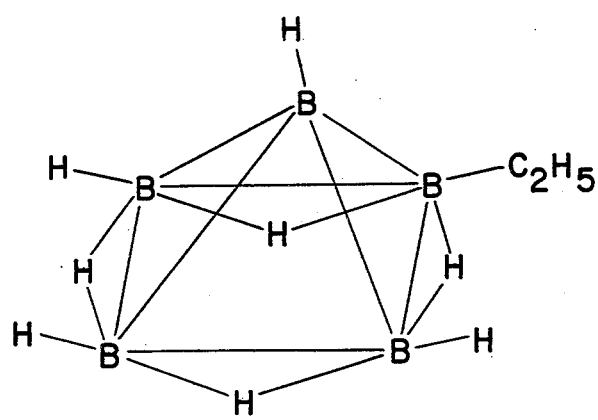

It is now found that ethylpentaborane(9) exists as several isomers and that these isomers do not all possess the same spontaneous ignition temperature and volatility. The structures of the several isomers are shown in the attached FIGURE 1 and FIGURE 2. The pentaborane(9) molecule is of a pyramidal structure, with four boron atoms forming the base of a tetragonal pyramid and the fifth boron atom at the apex position. According to the rules set forth in "The Nomenclature of Boron Compounds," issued May 15, 1956, by the Advisory Subcommittee on the Nomenclature of Boron Compounds, substituted derivatives of pentaborane(9) are named using numbers to indicate boron positions with the apex boron atom in the number 1 position. FIGURE 1 shows the 1-ethylpentaborane(9) in which the ethyl group is substituted for a hydrogen attached to the boron atom in the apex position of the pentaborane(9) structure. FIGURE 2 shows the 2-ethylpentaborane(9) molecule. In this isomer one of the base boron hydrogens is substituted by an ethyl group. It is apparent that four different isomers, each of which is base substituted, may exist. However, the characteristics of each insofar as they are pertinent to this invention appear to be the same. Since the preferred processes for the production of ethylpentaborane(9), including that described above, result invariably in the production of only 1-ethylpentaborane(9), and, further, since 1-ethylpentaborane(9) has a higher volatility and a lower spontaneous ignition temperature than do the 2-ethylpentaborane(9) isomers, it is apparent that a method for the conversion of 1-ethylpentaborane(9) isomer into 2-ethylpentaborane(9) isomers would be quite valuable to the high energy fuel art.

It is one object of this invention, therefore, to provide a method for the conversion of ethylpentaborane(9) into its more desirable isomers.

Another object is to provide ethylpentaborane(9) which is of lower volatility and which has a higher spontaneous ignition temperature than does the ethylpentaborane(9) which is produced in accordance with the presently preferred process.

Still another object of this invention is to provide a new chemical compound which is an intermediate in the conversion of 1-ethylpentaborane(9) into its base-substituted isomers.

Other objects will become apparent from time to time throughout the following specification and claims.

This invention is based upon my discovery that ethylpentaborane(9) may be converted from an apex-substituted isomer into a base-substituted isomer by contact with trimethylamine, $(CH_3)_3N$. I have further found that the temperature at which these substances are contacted affect the manner in which the conversion takes place.

Below about 28° C. ethylpentaborane(9) and trimethylamine react in a 1 to 1 molar ratio according to Equation 1.

(1) $C_2H_5B_5H_8 + (CH_3)_3N \rightarrow (CH_3)_3NH^+C_2H_5B_5H_7^-$

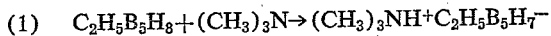

The product of this reaction is the trimethylammonium salt of ethylpentaborane(9). This compound dissociates at temperatures of about 28° C. and above to yield trimethylamine and ethylpentaborane(9); the ethylpentaborane(9) which is formed as a result of the dissociation is invariably the base-substituted isomer.

If ethylpentaborane(9) and trimethylamine are contacted at temperatures above 28° C. a dynamic equilibrium is established according to Equation 2.

(2) $C_2H_5B_5H_8 + (CH_3)_3N \rightleftarrows (CH_3)_3N + C_2H_5B_5H_8$ 1-ethyl-                              2-ethyl-
pentaborane(9)                     pentaborane(9)

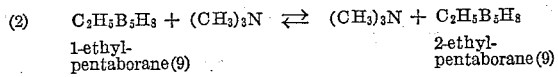

Thus the ethylpentaborane(9) after contact with the trimethylamine at these temperatures consists of a mixture of 1-ethylpentaborane(9) and 2-ethylpentaborane(9). By maintaining the substances in contact for an appreciable time the product is predominantly 2-ethylpentaborane(9).

The temperature at which the substances are preferably contacted varies according to the nature of the product desired. Thus, at temperatures below 28° C. 1-ethylpentaborane(9) can be quantitatively converted to base-substituted isomer by reaction with sufficient quantity of trimethylamine. At these temperatures, however, any excess 1-ethylpentaborane(9) is not changed by the action of trimethylamine so that a 1 to 1 molar ratio is necessary to effect complete conversion to the base-substituted isomer. At temperatures above 28° C. comparatively little amine is necessary since the amount of amine is not critical to the conversion but simply determines the reaction rate. Any finite amount of trimethylamine can be used but it is preferred to use at least about 1%. However, in this case the product is not pure base-substituted isomer but consists of a mixture of base-substituted isomer and some apex-substituted isomer. While temperatures higher than 28° C. may be used, and for most purposes are desirable in order to increase the reaction rate, relatively high temperatures are to be avoided if possible because prolonged contact of the reactants at temperatures about 75° C. results in cleavage of the ethylpentaborane(9) because of further reaction with trimethylamine.

This method will be discussed further in conjunction with the following examples.

*Example 1.*—A glass reaction tube was charged with 4.02 moles of trimethylamine and 4.02 millimoles of 1-ethylpentaborane(9). The tube was sealed and allowed to remain at 20 to 25° C. for one-half hour. The tube was then opened and the product analyzed. It was found that no trimethylamine was present and no ethylpentaborane(9) was present; the product was a 1 to 1 adduct of trimethylamine and ethylpentaborane(9). The structure of this product was studied through its infrared spectra, thermal decomposition and chemical reactions. These studies showed that it was the trimethylammonium salt of ethylpentaborane(9) having the structure $(CH_3)_3NH^+C_2H_5B_5H_7^-$. The compound was a stable, non-volatile white solid which melted at about 27 to 28° C. with slow decomposition. Upon heating this compound to about 28° C. and above, it dissociated to produce trimethylamine and ethylpentaborane(9). The ethylpentaborane(9) thus produced was shown through its infra-red spectra, mass spectrometric analysis and vapor pressure measurements to be a base-substituted isomer. It was a colorless liquid with vapor pressures of 7.0 millimeters at 0° C. and 23.5 millimeters at 26° C., and had a spontaneous ignition temperature considerably lower than that of the 1-ethylpentaborane(9) from which it was produced.

Example II.—A tube was charged with 4.78 millimoles of ethylpentaborane(9) and 1.01 millimoles of trimethylamine. The mixture was maintained at 39° C. for 75 minutes. At the end of this time the ethylpentaborane(9) was removed and analyzed and it was found to consist of 78% 2-ethylpentaborane(9) and 22% of 1-ethylpentaborane(9).

Example III.—2.15 millimoles of trimethylamine and 4.28 millimoles of 1-ethylpentaborane(9) were contacted at 28° C. for one-half hour. At the end of this time the ethylpentaborane(9) recovered consisted of 53% 2-ethylpentaborane(9) and 47% 1-ethylpentaborane(9).

As the above examples indicate the rate at which the equilibrium results in the conversion of the apex-substituted isomer into the base-substituted ethylpentaborane(9) depends upon the temperature used as well as the time of contact. At about 75° C. it was found that all the 1-ethylpentaborane(9) was converted in less than one-half hour. However, at this temperature recovery of ethylpentaborane(9) was relatively low because of cleavage of this compound to trimethylborane and a yellow oil. Thus, it is desirable to carry out the conversion at temperatures below 75° C., and preferably below 60° C.

According to the provisions of the patent statutes, I have explained the principle and mode of practicing my invention, have described what I now consider to be its best embodiments. However, I desire to have it understood that within the scope of the appended claims, the invention may be practiced otherwise than as specifically described.

I claim:
1. A method for the conversion of 1-ethylpentaborane(9) to 2-ethylpentaborane(9) which comprises reacting 1-ethylpentaborane(9) with trimethylamine at a temperature above about 28° C. and recovering the 2-ethylpentaborane(9) thus formed.

2. A method for the conversion of 1-ethylpentaborane(9) to 2-ethylpentaborane(9) which comprises reacting 1-ethylpentaborane(9) with trimethylamine at a temperature below 28° C., warming the product thus produced above about 28° C., and recovering the 2-ethylpentaborane(9) thus formed.

3. A method according to claim 2 in which about one mol of trimethylamine is used for each mol of 1-ethylpentaborane(9).

4. A method for the preparation of the trimethylammonium salt of ethylpentaborane(9), $$(CH_3)_3NH^+C_2H_5B_5H_7^-$$

which comprises reacting ethylpentaborane(9) with trimethylamine at a temperature below 28° C. and recovering the trimethyl ammonium salt of ethylpentaborane(9) thus formed.

5. The compound trimethylammonium ethylpentaborane(9), $(CH_3)_3NH^+C_2H_5B_5H_7^-$.

No references cited.